Aug. 27, 1963

M. REASER 3,101,964

FISHHOOK HOLDER

Filed March 6, 1961

INVENTOR
MARSHALL REASER
BY HIS ATTORNEYS
HARRIS, KIECH, RUSSELL & KERN

United States Patent Office 3,101,964
Patented Aug. 27, 1963

3,101,964
FISHHOOK HOLDER
Marshall Reaser, 18739 E. Milton Drive,
Glendora, Calif.
Filed Mar. 6, 1961, Ser. No. 93,788
4 Claims. (Cl. 289—17)

My invention relates to fishhook holders, and more particularly to a fishhook holder having a retractable retaining hook for holding a fishhook in a position to be tied to a fishing line or the like.

Prior fishhook holders have included spring loaded retaining hooks which extend outwardly from an opening therein and substantially in line with the axis of such opening. Retaining hooks mounted in this manner have a tendency to engage the periphery of such opening upon their attempted retraction into the body of the holder.

Accordingly, it is an object of this invention to provide a fishhook holder wherein the retaining hook is bent relative to the axis of the opening in the holder and the hook portion at the free end of the retaining hook is positioned to one side of such axis with the opening of such hook portion facing such axis to prevent engagement of the hook portion with the periphery of the opening.

Another object of this invention is to provide a fishhook holder wherein the retaining hook may be extended from a housing by an actuating means whereby such actuating means acts in opposition to a biasing means urging the actuating means in a direction to retract the retaining hook into the housing.

A further object of this invention is to provide a simple and efficient device for retaining fishhooks in a relatively stable position while they are being tied to a fishing line or the like.

Still another object of this invention is to provide a fishhook holder including an elongated hollow housing having a small orifice at one end thereof, a longitudinal rod extending through the housing and having at one end a retaining hook smaller than the orifice but adapted when the hook is extended from the housing to retain a transverse element against the orifice end of the housing, an actuating means extending into the hollow housing for reciprocating the rod relative to the housing, and a biasing means for urging the actuating means in a direction to retract the hook of the longitudinal rod into the housing.

Another object of the invention is to provide a fishhook holder that is small, light weight, and adapted to be removably secured to the pockets or the like of the user's clothes.

A still further object of this invention is to provide a fishhook holder including an elongated hollow housing having a small orifice at one end thereof, a longitudinal rod extending through the housing and having at one end a retaining hook smaller than the orifice and adapted when extended from the housing to retain a transverse element against the orifice end of the housing, the rod being bent so as to position the retaining hook substantially to one side of the axis of the orifice of the holder in the direction opposite the open portion of the hook to prevent the engagement of the hook with the perihery of the orifice of the holder, an actuating means extending into the hollow housing for reciprocating the rod relative to the housing, and a biasing means for urging the actuating means in a direction to retract the retaining hook into the housing.

Still another object of this invention is to provide a fishhook holder whereby a fishhook may be held in a relatively stable position by a retaining means which encumbers a minimum area of the fishhook and provides for maximum accessibility to the line-tying portion of such fishhook.

The foregoing objects, advantages, features and results of the present invention, together with various other objects, advantages, features and results thereof which will be evident to those skilled in the art to which the invention pertains, may be achieved with the exemplary embodiment described in detail hereinafter and illustrated in the accompanying drawing, in which.

Figure 1:
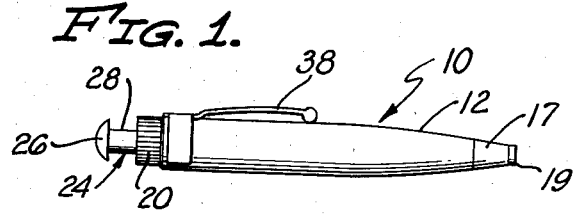
FIG. 1 is a half-sized side elevational view of a preferred embodiment of the invention.
Figure 2:
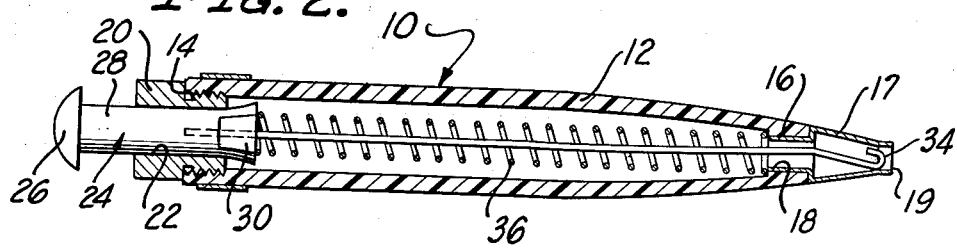
FIG. 2 is a cross-sectional view of the invention taken on a median plane.
Figure 3:
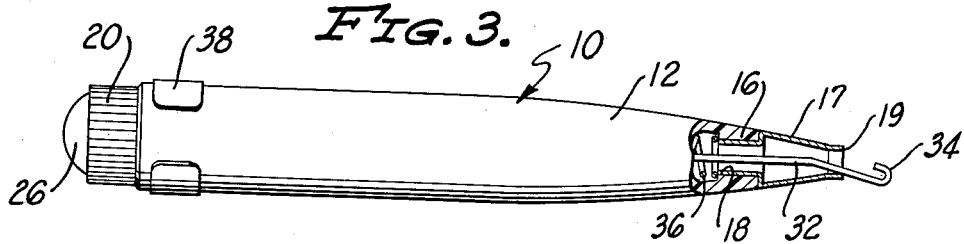
FIG. 3 is a partially cross-sectional side view of the invention.

Referring to the drawing, FIGS. 1 and 2 exhibit a fishhook holder 10 including an elongated hollow housing 12 of circular cross section and made of a light, durable and noncorrosive material such as plastic or the like. The housing 12 has a threaded opening 14 at one end and a smaller orifice 16 at the other end thereof. Correspondingly the diameter of the housing 12 diminishes from the threaded opening 14 to the smaller orifice 16 with the result that the housing 12 is tapered therealong. Adapted to frictionally fit within the small orifice 16 of the housing 12 is a tapered nozzle 17 having a portion of reduced diameter 18 at one end which extends radially inwardly into the orifice a greater distance than the normal thickness of the housing 12 and having a flanged opening 19 at the other end. Threadedly connected within the opening 14 at the other end of the housing 12 is a circular insert 20.

The circular insert 20 has an axial opening 22 extending longitudinally therethrough. Passing through the opening 22 is an actuating member 24 including a head 26 of greater diameter than the opening 22 and located on the exterior of the housing 12, a cylindrical stem 28 extending from the head 26 into and through the opening 22 and of a diameter just slightly less than that of the opening 22, and a securing portion 30 located on the interior of the housing 12 and comprising the end of the stem 28 which has been distorted under pressure to create a flanged portion of greater diameter than the opening 22. The length of the cylindrical stem 28 is substantially greater than the length of the longitudinal opening 22 thereby permitting the actuating member 24 to move reciprocally therethrough, the limitations on such movement being provided by the head 26 and the securing portion 30 at the respective ends thereof.

Extending from and rigidly affixed to the securing portion 30 of the actuating member 24 is a semi-rigid rod 32. The rod 32 extends substantially the entire length of the housing 12, terminating in a hook 34 adjacent the opening 19 in the nozzle 17. More particularly, the rod 32 is of a length to have its hook 34 retracted within the nozzle 17 when the head 26 of the actuating member 24 is displaced a maximum distance from the circular insert 20 as determined by the length of the cylindrical stem 28 and to have its hook 34 extended from the nozzle opening 19 when the head 26 is abutting the circular insert 20. Further, the rod 32 is bent laterally in the plane of its hook 34, at a point adjacent the hook, and away from the opening of the hook 34. Surrounding the semi-rigid rod 32 is a spring 36 loaded between the securing portion 30 of the actuating member 24 and the portion of reduced diameter 18 of the nozzle 17 for biasing the actuating member 24 away from housing 12.

Located on the exterior of the housing 12 is a resilient clip 38 adapted to frictionally fit thereon for securing such fishhook holder 10 to a pocket of the user's clothing.

In actual operation, the head 26 of the actuating member 24 is depressed inwardly with sufficient force to overcome the biasing action of the spring 36. This movement of the actuating member 24 longitudinally displaces the semirigid rod 32 within the hollow housing 12 thereby causing the hook 34 located at the end of such rod to pass outwardly through the nozzle opening 19 to the exterior of the housing 12. The rod 32 being bent laterally acts to bias the hook 34 away from the axis of the housing 12 when such hook is extended from the nozzle opening 19 to prevent the end of such hook from engaging the flanged edge of the nozzle opening 19 when the hook 34 is retracted by the biasing action of the spring 36.

While the hook 34 is extended from the nozzle opening 19 a fishhook 40 may be inserted within the hook 34. The head 26 of the actuating member 24 is then released and the biasing action of the spring 36 urges the actuating member 24 outwardly thereby causing the hook 34 to be retracted toward the nozzle opening 19. The fishhook 40 is then retained against the flanged nozzle opening 19 by the inward retractive force exerted on the hook 34.

Figure 4:
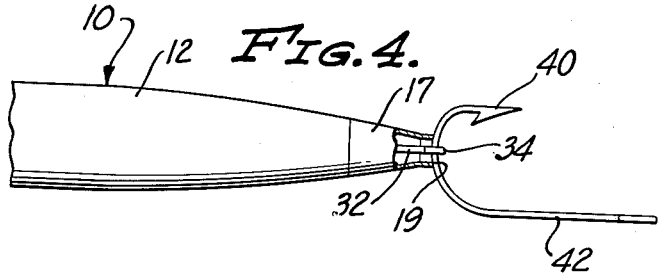
FIG. 4 is a fragmentary elevational view of the invention utilized in conjunction with a fishhook.

Once the fishhook 40 is firmly positioned as in FIG. 4 of the drawing the user of the holder 10 has the maximum use of his fingers and maximum accessibility to the shank or neck 42 of the fishhook 40 for tying a fishing line or fishing leader material thereto. When the fishhook 40 has been tied to a fishing leader or the like the actuating member 24 may again be depressed to overcome the biasing action of the spring 36 thereby extending the hook 34 outwardly from the nozzle opening 19 and permitting the removal of the fishhook 40.

Although an exemplary embodiment of the invention has been disclosed herein for purposes of illustration, it will be understood that various minor changes, modifications and substitutions may be incorporated in such embodiment without departing from the spirit of the invention as defined in the claims which follow.

I claim:

1. In a fishhook holder, the combination of: an elongated hollow housing having a large opening at one end thereof and a smaller orifice at the other end; a longitudinal fishhook receiving means extending through said housing including a longitudinal rod terminating at one end thereof in a hook located adjacent the small orifice end of said housing, said hook being smaller than said small orifice and movable therethrough from a retracted position within said housing to an extended position exterior of said small orifice end of said housing, and said rod having a lateral bend therein in the plane of said hook and away from the opening of said hook to position said hook to one side of the axis of said housing when said hook is extended therefrom; an actuating means extending into said housing adjacent the large opening therein and engageable with said longitudinal rod for longitudinally moving said rod between positions wherein said hook is located within said housing and wherein said hook is located exterior of said housing; and a biasing means for urging said actuating means in a direction so as to retract said hook into said hollow housing.

2. In a fishhook holder, the combination of: an elongated hollow housing having an opening at each end thereof; an actuating means extending through and longitudinally movable within said housing and having a length slightly greater than the length of said housing, said actuating means having a retractable retaining hook at one end thereof adjacent one of the open ends of said housing and adapted to retain a transverse element against said opening in said housing, said transverse element spanning the diameter of said opening, said retaining hook being smaller than said opening and movable therethrough from a retracted position within said housing to an extended position exterior of said opening in the housing in response to said longitudinal movement of said actuating means, and said actuating means having a lateral bend therein adjacent said retaining hook, in the plane of said hook, and away from the opening of said hook to position said hook to one side of the axis of said housing when said hook is extended therefrom; and a biasing means for urging said actuating means toward the opposed open end of said housing and in a direction to retract said retaining hook into said housing.

3. In a fishhook holder, the combination of: an elongated hollow housing having an opening at each end thereof; an actuating means located at one end of said housing, extending into said housing, and longitudinally axially movable within said housing; a biasing means for urging said actuating means in a direction toward said end of said housing; a stop means secured to said housing and engageable with said actuating means for limiting the movement of asid actuating means in a direction toward said end of said housing; and a longitudinal fishhook receiving means including a longitudinal rod secured at one end thereof to said actuating means and terminating at the other end thereof in a hook located adjacent the opposed open end of said housing and said hook being smaller than said opposed open end, said rod having a lateral bend therein in the plane of said hook and away from the opening of said hook, and said rod having a length sufficient to permit said hook to be positioned within said housing when said actuating means is in engagement with said stop means and to permit said hook to be movable through said opposed open end of said housing and positioned exterior of said housing when said actuating means is moved inwardly of said housing and in a direction away from said stop means.

4. In a fishhook holder, the combination of: an elongated hollow housing having a large opening at one end thereof and a smaller orifice at the other end, said housing having a portion of reduced diameter adjacent said smaller orifice end; a reciprocating, longitudinally movable, actuating means extending into said housing adjacent said large open end; a longitudinal fishhook receiving means including a longitudinal rod secured to said actuating means at one end thereof and terminating at the opposed end adjacent said small orifice in a retractable retaining hook, said hook being smaller than said small orifice and movable therethrough from a retracted position within said housing to an extended position exterior of said small orifice end of said housing, said rod having a length to extend said retaining hook outwardly from the small orifice end of said housing in response to the longitudinally inward movement of said actuating means and to retract said hook within said housing in response to the longitudinally outward movement of said actuating means, and said rod being bent laterally in the plane of said hook and away from the opening of said hook to position said hook to one side of the axis of said housing when said hook is extended therefrom; and a spring loaded within said housing between the portion of reduced diameter adjacent the small orifice end of said housing and said actuating means for urging said actuating means in a direction to retract said retaining hook into said housing.

UNITED STATES PATENTS

References Cited in the file of this patent

| | | |
|---|---|---|
| 1,481,754 | Stalson | Jan. 22, 1924 |
| 2,455,833 | Trombetta | Dec. 7, 1948 |
| 2,700,840 | Butts | Feb. 1, 1955 |
| 2,859,994 | Whitlinger | Nov. 11, 1958 |
| 2,934,369 | Kennedy | Apr. 26, 1960 |